United States Patent
Bhanujan et al.

(10) Patent No.: US 9,473,570 B2
(45) Date of Patent: Oct. 18, 2016

(54) INSTANTIATING AN APPLICATION FLOW INTO A CHAIN OF SERVICES IN A VIRTUAL DATA CENTER

(71) Applicant: Cisco Technology, Inc., San Jose, CA (US)

(72) Inventors: Shiva Bhanujan, Fremont, CA (US); Senhua Huang, Davis, CA (US)

(73) Assignee: Cisco Technology, Inc., San Jose, CA (US)

( * ) Notice: Subject to any disclaimer, the term of this patent is extended or adjusted under 35 U.S.C. 154(b) by 472 days.

(21) Appl. No.: 13/802,619

(22) Filed: Mar. 13, 2013

(65) Prior Publication Data

US 2014/0280950 A1 Sep. 18, 2014

(51) Int. Cl.
*G06F 15/16* (2006.01)
*H04L 29/08* (2006.01)
*G06F 9/50* (2006.01)

(52) U.S. Cl.
CPC ......... *H04L 67/1002* (2013.01); *G06F 9/5055* (2013.01); *H04L 67/2885* (2013.01); *G06F 2209/5015* (2013.01)

(58) Field of Classification Search
CPC ....................... H04L 67/1097; H04L 67/1008
USPC ......................................................... 709/220
See application file for complete search history.

(56) References Cited

U.S. PATENT DOCUMENTS

| | | | |
|---|---|---|---|
| 2010/0169537 A1* | 7/2010 | Nelson | 711/6 |
| 2011/0022642 A1 | 1/2011 | deMilo et al. | |
| 2011/0022812 A1* | 1/2011 | van der Linden | G06F 9/5077 711/163 |
| 2011/0255538 A1* | 10/2011 | Srinivasan et al. | 370/392 |
| 2012/0166619 A1* | 6/2012 | Mefford et al. | 709/224 |
| 2013/0018999 A1* | 1/2013 | Merrill et al. | 709/223 |
| 2013/0263125 A1 | 10/2013 | Shamsee et al. | |

OTHER PUBLICATIONS

Shamsee et al., U.S. Appl. No. 13/437,849, filed Apr. 2, 2012.
NETSYS General Product Questions, Document ID: 15174, [online], Oct. 1, 2009, [retrieved on Jul. 16, 2012]. Retrieved from the Internet: <URL: http://www.cisco.com/image/gif/paws/15174/54.pdf>, 5 pages.
Cisco Cloud Computing—Data Center Strategy, Architecture, and Solutions, Point of View White Paper for U.S. Public Sector, 1st Edition, [online], 2009, [retrieved on Feb. 16, 2012}. Retrieved from the Internet: <URL:http://www.cisco.com/web/strategy/docs/gov/CiscoCloudComputing_WP.pdf>, pp. 1-16.

(Continued)

*Primary Examiner* — Adnan Mirza

(74) *Attorney, Agent, or Firm* — Leon R. Turkevich

(57) ABSTRACT

In one embodiment, a method comprises creating a hierarchal chain of network services in response to instantiation within a data center of a virtualized application providing an application service, the chain having a corresponding hierarchal proxy endpoint identifier for each network service in the chain; registering the chain of network services as a logical path for reaching the application service within the data center; and routing, within the data center, a web-based service request for the application service to the chain of network services for execution by the virtualized application.

20 Claims, 6 Drawing Sheets

(56) References Cited

OTHER PUBLICATIONS

"Nicira Virtualizes the Network", [online], 2012, [retrieved on Jul. 16, 2012]. Retrieved from the Internet: <URL:http://nicira.com>, 1 page.

Right Scale, "Cloud Management for Public and Private Clouds by RightScale", [online], 2012, [retrieved on Jul. 16, 2012]. Retrieved from the Internet: <URL:http://www.rightscale.com>, pp. 1-7.

Serval Architecture, "Serval a Leap Toward Next-Generation", [online], 2012, [retrieved on Jul. 16, 2012}. Retrieved from the Internet: <URL:http://www.serval-arch.org/>, pp. 1-2.

Nordstrom et al., "Serval: An End-Host Stack for Service-Centric Networking", [online] In Proc. 9th Symposium on Networked Systems Design and Implementation (NSDI '12), San Jose, CA, Apr. 2012, retrieved on Jul. 17, 2012. Retrieved from: <URL:http://www.serval-arch.org/docs/serval-nsdi12.pdf>, pp. 1-14.

\* cited by examiner

INSTANTIATING AN APPLICATION FLOW INTO A CHAIN OF SERVICES IN A VIRTUAL DATA CENTER

TECHNICAL FIELD

The present disclosure generally relates to allocating data center resources in a multitenant service provider (SP) data network for implementation of a virtual data center (vDC) providing cloud computing services for a customer.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Cloud-based application services (e.g., web server services, database services, etc.) are based on providing a user access to an instance of a virtualized application that is executed within a data center. One example deployment of a "virtualized application" (vApp) can be based on installation of the vApp within a virtualized operating system, for example an instance of Ubuntu executed within a virtual machine (e.g., commercially available from VMware, Inc., Palo Alto, Calif.) that is deployed within a data center. Part of the installation of the vApp includes a file system of the virtualized operating system establishing a path for reaching the vApp within the virtualized operating system; hence, a user can reach the vApp via the virtualized operating system based on the file system contained in the virtualized operating system. Consequently, instantiation of the vApp is integrally combined with access to the vApp, such that the vApp is instantiated within the virtualized operating system in response to a user of the virtualized operating system requesting access to the vApp.

Attempts to disassociate the instantiation of the vApp from the access to the vApp has required network administrators to manually provision a network path for reaching each instance of the virtual machine executing the vApp, such that each network path requires manually connecting ("binding") a corresponding sequence of network services (e.g., firewall service instance, load balancer instance, etc.) to the virtual machine.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
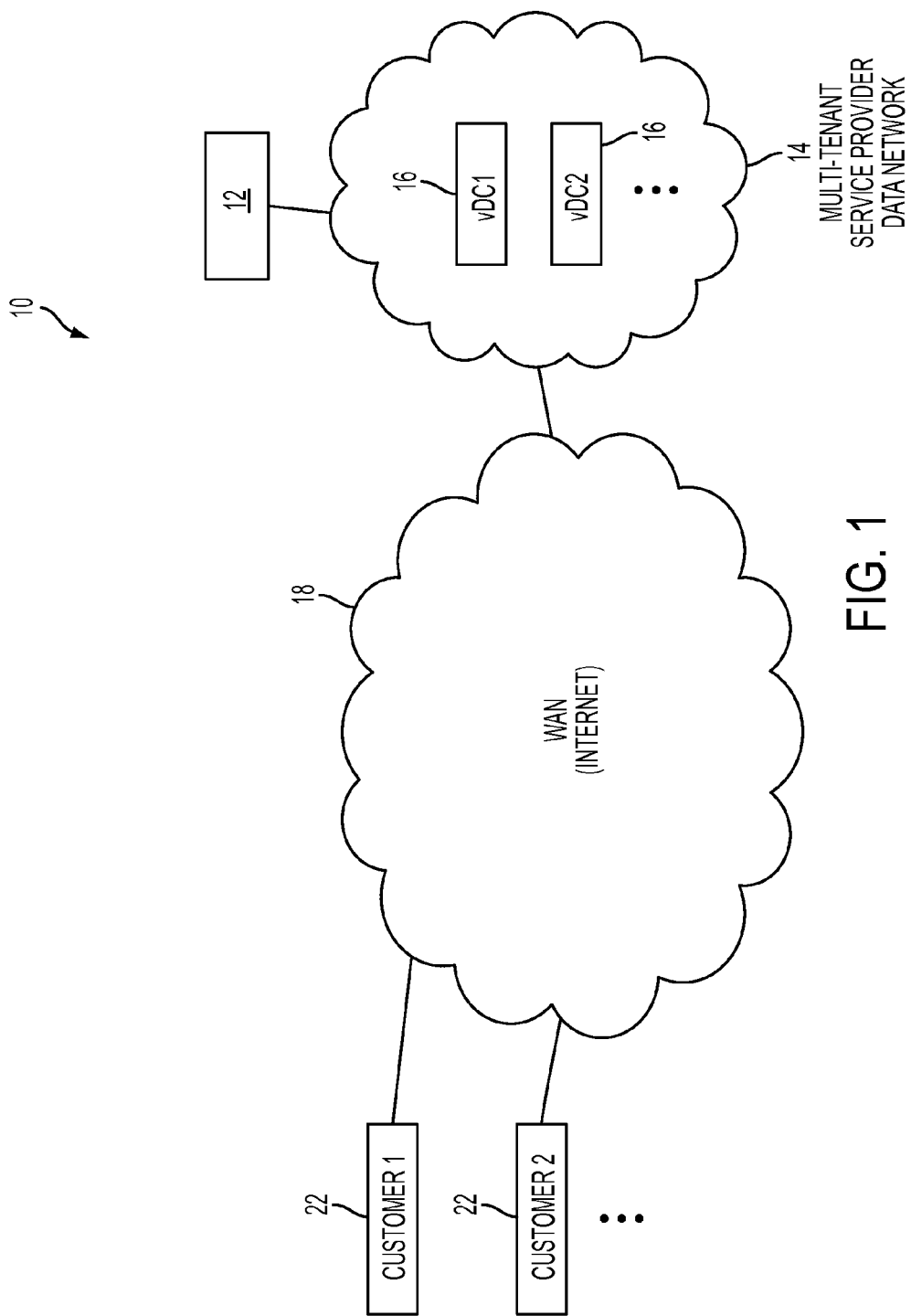
FIG. 1 illustrates an example system having an apparatus for creation and registration, within a data center, of a hierarchal chain of network services for reaching an application service in response to instantiation of a virtualized application providing the application service, according to an example embodiment.

In one embodiment, a method comprises creating a hierarchal chain of network services in response to instantiation within a data center of a virtualized application providing an application service, the chain having a corresponding hierarchal proxy endpoint identifier for each network service in the chain; registering the chain of network services as a logical path for reaching the application service within the data center; and routing, within the data center, a web-based service request for the application service to the chain of network services for execution by the virtualized application.

In another embodiment, an apparatus comprises a processor circuit and a network interface circuit. The processor circuit is configured for creating a hierarchal chain of network services in response to instantiation within a data center of a virtualized application providing an application service, the chain having a corresponding hierarchal proxy endpoint identifier for each network service in the chain. The processor circuit further is configured for registering the chain of network services as a logical path for reaching the application service within the data center. The network interface circuit is configured for routing, within the data center, a web-based service request for the application service to the chain of network services for execution by the virtualized application.

DETAILED DESCRIPTION

Particular embodiments provide enhanced flexibility and control in a virtualized data center configured for hosting an application service based on execution of a virtualized application configured for providing the application service. The particular embodiments can dynamically create a relationship between the virtualized application and network services configured for providing network user access to the virtualized application. The dynamically created relationship can enable separation of instantiation of the virtualized application from the access to the virtualized application; hence, network services associated with providing access to the virtualized application can be configured and managed separately from the virtualized application.

Moreover, the example embodiments create a hierarchal chain of network services in response to instantiation of the virtualized application, where the instantiation causes the existence of the virtualized application to be hierarchically propagated from the virtualized application to a logical network element configured for routing web-based service requests for the associated application service: each network service in the hierarchal chain has a corresponding hierarchal proxy endpoint identifier, enabling the hierarchal chain of network services to be registered as a path for reaching the application service. In other words, each hierarchal proxy endpoint identifier provides a required logical "hop" for reaching the application service via the corresponding proxy endpoint; consequently, the chain of hierarchal proxy endpoint identifiers forms a logical path (e.g., a contiguous sequence of logical "hops") that must be followed to reach the application service within the data center.

Hence, the creation of the hierarchal chain of network services in response to the instantiation of the virtualized application enables the logical path to be generated from the virtualized application toward the logical network element routing service requests; hence, the example embodiments eliminate the necessity for any prior techniques that attempted to reach the virtualized application, for example network services that attempted to create a topology-specific path to reach the virtualized application. Moreover, the logical path comprising the hierarchal chain of network services can be used to create a single exclusive topology-based logical path for reaching the application service according to a prescribed physical topology deployed within the data center.

FIG. 1 is a diagram illustrating an example system 10 having an apparatus 12 that can register a hierarchal chain of network services created in response to instantiation of a virtualized application within a virtualized data center 16 of a service provider data network 14, according to an example embodiment. The apparatus 12 is a physical machine (i.e., a hardware device) configured for implementing network communications with other physical machines via the service provider data network 10 and/or a wide area network (WAN) (e.g., the Internet) 18. Hence, the apparatus 12 is a network-enabled user machine providing user access to a network and implementing network communications via the network 10.

The apparatus 12 can be configured for implementing virtual data centers 16 for respective customers (e.g., tenants) 22 in a multitenant environment, where virtual data centers 16 can be implemented within the service provider data network 14 using shared physical resources, while logically segregating the operations of the virtual data centers 16. Hence, the service provider data network 14 can include a physical topology 14a and a logical topology 14b overlying the physical topology 14a.

Figure 2:
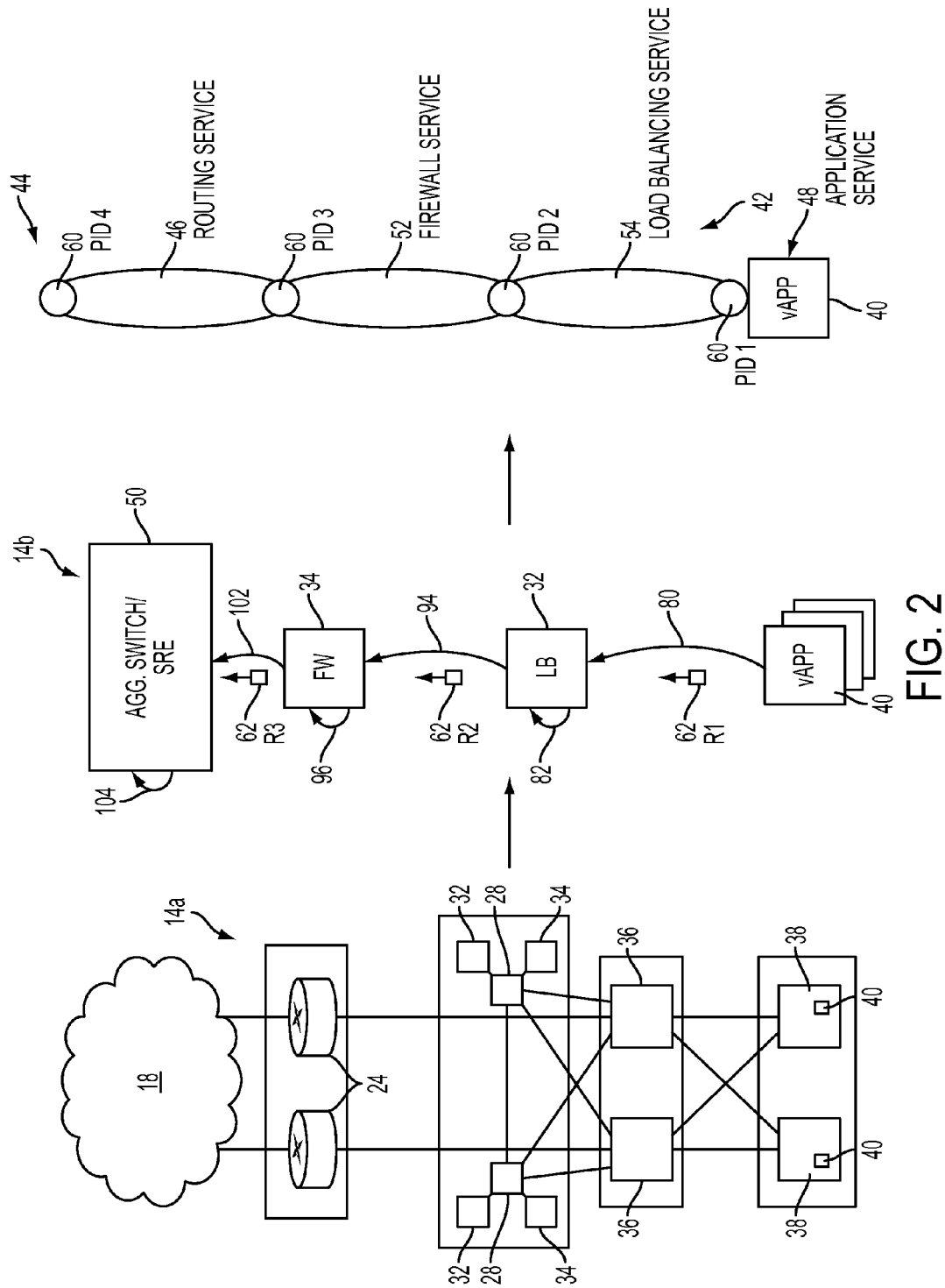
FIG. 2 illustrates an example hierarchal chain of the network services providing reachability to the application service based on hierarchal proxy endpoint identifiers for each network service in the chain, according to an example embodiment.

FIG. 2 illustrates an example logical topology 14b overlying an example physical topology 14a of the service provider data network, according to an example embodiment.

The physical topology 14a can include one or more provider edge routers 24, one or more aggregation switches 28, one or more load balancer devices 32, one or more firewall nodes (physical devices or virtualized) 34, one or more access switches 36, and one or more compute elements 38. The devices illustrated in the physical topology can be implemented using commercially available devices, for example the access switches 36 can be implemented using the commercially available Cisco Nexus 7000 or 5000 Series Access Switch from Cisco Systems, San Jose, Calif.; various physical devices can be used to implement the compute elements 38, depending on the chosen virtual data center service or cloud computing service operation to be provided (e.g., compute, storage, or network service). An example compute element 38 providing compute services could be a unified computing system (e.g., the Cisco UCS B-Series Blade Servers and/or the Cisco Nexus 1000v series switches) commercially available from Cisco Systems.

The compute element 38 can be configured for implementing at least a portion of a virtualized data center, namely a virtualized application (vApp) 40 that is instantiated within a virtual machine, for example a virtual machine commercially-available from VMWare, Inc.

FIG. 2 also illustrates an example logical topology 14b overlying an example physical topology 14a of the service provider data network, according to an example embodiment. In particular, web-based service requests (also referred to as "user request" or "tenant traffic") originated by users 22 must traverse a prescribed hierarchal path of network services before reaching a virtualized application 40 providing a prescribed application service 48. Tenant traffic is classified by a routing service 46 executed by an aggregation switch 50, also referred to as a "service routing engine" (SRE) 50, that determines a destination application that should be accessed in response to the customer request. Access by the tenant traffic also is controlled by a firewall service 52 executed by the firewall device 34. Each web-based service request, having been passed by the firewall device 34 executing the firewall service 52, is selectively routed by the load balancer device 32 during execution of a load balancing service 54: the load balancing service 54 routes the web-based service request to one of a plurality of executable instances of the virtualized application 40.

Conventional network configuration systems have assumed that a path for reaching the virtualized application needed to be constructed starting from the aggregation switch 50, and ending at the load balancing service 54.

As described in further detail below, example embodiments utilize the logical topology 14b to form a hierarchal chain of network services 42 based on instantiation of the virtualized application 40. The hierarchal chain of network services 42 can establish a logical path 44 between the application service and a "front end" service 46 configured for routing a web-based service request (e.g., from a user 22 via the wide area network 18) to the hierarchal chain 42 of network services for execution by the virtualized application 40.

According to an example embodiment, application instantiation is employed to enable the virtualized application 40 to be instantiated independent from access to the application 40. In particular, the virtualized application 40 is composed of the following elements: the application service provided by execution of the virtualized application in the virtual machine; access to data relied upon by the virtualized application during execution in the virtual machine in order provide the application service (also referred to as "application data"); access to the virtualized application from outside the virtual machine; and runtime execution of the virtualized application.

Hence, the example embodiment separates instantiation of the virtualized application 40 from access to the virtualized application 40 (e.g., by a user 22 of the application service provided by the virtualized application 40). Moreover, the example embodiments eliminate the necessity for creating a logical path 42 for reaching the virtualized application 40, since the path for reaching the virtualized application 40 is propagated "outward" from the virtualized application 40 toward the routing service 46.

The hierarchal chain of network services 42 is based on each logical node in the logical hierarchy sending a registration request 62 to a successive next-hop logical node that provides an exclusive service endpoint for reaching the corresponding logical node: the registration request (e.g., "R1") 62 includes logical reachability information for reaching the source of the registration request (e.g., "vApp" 40);

the successive next-hop logical node (e.g., load balancer 32) can respond to reception of the registration request (e.g., "R1") 62 by creating the corresponding hierarchal proxy endpoint identifier (e.g., "PID2") 60 as a pointer for reaching the logical node having sent the request (e.g., vApp) 40, and creating an internal table entry specifying that the destination associated with the hierarchal proxy endpoint identifier (e.g., "PID2") (e.g., the destination vApp 40) is reachable via the received hierarchal proxy endpoint identifier (e.g., "PID1") 60 at a specified reachable address. Hence, the next-hop logical node creates an association between the corresponding generated hierarchal proxy endpoint identifier (e.g., PID2), the received hierarchal proxy endpoint identifier (e.g., PID1), and the reachability address associated with the received hierarchal proxy endpoint identifier. In one embodiment, hierarchal proxy endpoint identifier may the same value as its associated reachability address; alternately, the hierarchal proxy endpoint identifier may have a value that is different than the associated reachability address.

Hence, the hierarchal chain of network services 42 includes hierarchal proxy endpoint identifiers 60 for each network service in the chain, each hierarchal proxy endpoint identifier 60 serving as a logical pointer for reaching the next hierarchal "hop" in the hierarchal chain 42. Hence, the routing service 46 uses the hierarchal proxy endpoint identifier "PID3" 60 to reach the application service 48 via the firewall service 52; the firewall service 52 uses the hierarchal proxy endpoint identifier "PID2" 60 to reach the application service 48 via the load balancing service 54; and the load balancing service 54 uses the hierarchal proxy endpoint identifier "PID1" 60 to reach the virtualized application 40 providing the application service 48. As described below, each hierarchal proxy endpoint identifier 60 can be implemented as a reachability address, for example a logical Internet Protocol (IP) address used by a corresponding service, or a physical IP address (and TCP/UDP port identifier) identifying the corresponding service executed within a physical machine.

Figure 3:
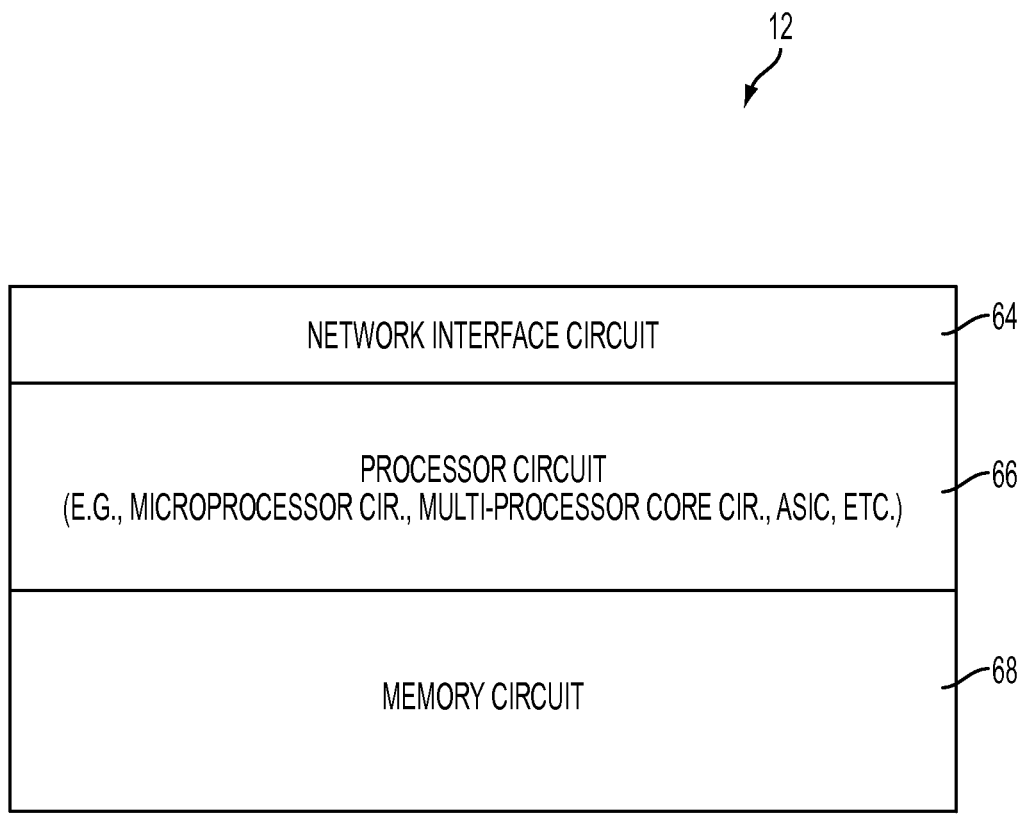
FIG. 3 illustrates an example apparatus for creation and registration of the hierarchal chain of network services for reaching the virtualized application providing the application service, according to an example embodiment.

FIG. 3 illustrates the example apparatus 12 configured for creating the hierarchal chain of network services 42 in response to instantiation of a virtualized application 40, according to an example embodiment. The apparatus 12 can be implemented as a single physical machine (i.e., a hardware device) configured for implementing network communications with other physical machines via the network 14. Alternately, the apparatus 12 can be implemented as multiple physical machines configured for implementing distributed computing based on coordinated communications between physical machines in the network 14.

The apparatus 12 can include a network interface circuit 64, a processor circuit 66, and a non-transitory memory circuit 68. The apparatus can be implemented, for example, as at least part of the aggregation switch 50. As described in further detail below with respect to FIG. 4, the processor circuit 66 can be configured for creating the hierarchal chain 42 of network services in response to instantiation within the virtualized data center 16 of a virtualized application 40 providing an application service 48, where the chain 42 has a corresponding hierarchal proxy endpoint identifier 60 for each network service in the chain. The processor circuit also can be configured for registering the chain of network services into the memory circuit 68 as a logical path 44 for reaching the application service 48 within the virtualized data center 16. The network interface circuit 68 can be configured for routing, within the data center, a web-based service request for the application service to the chain of network services for execution by the virtualized application.

Any of the disclosed circuits of the apparatus 12 (including the network interface circuit 64, the processor circuit 66, memory circuit 68, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 68) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 68 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 68 can be implemented dynamically by the processor circuit 66, for example based on memory address assignment and partitioning executed by the processor circuit 66.

Figure 4:
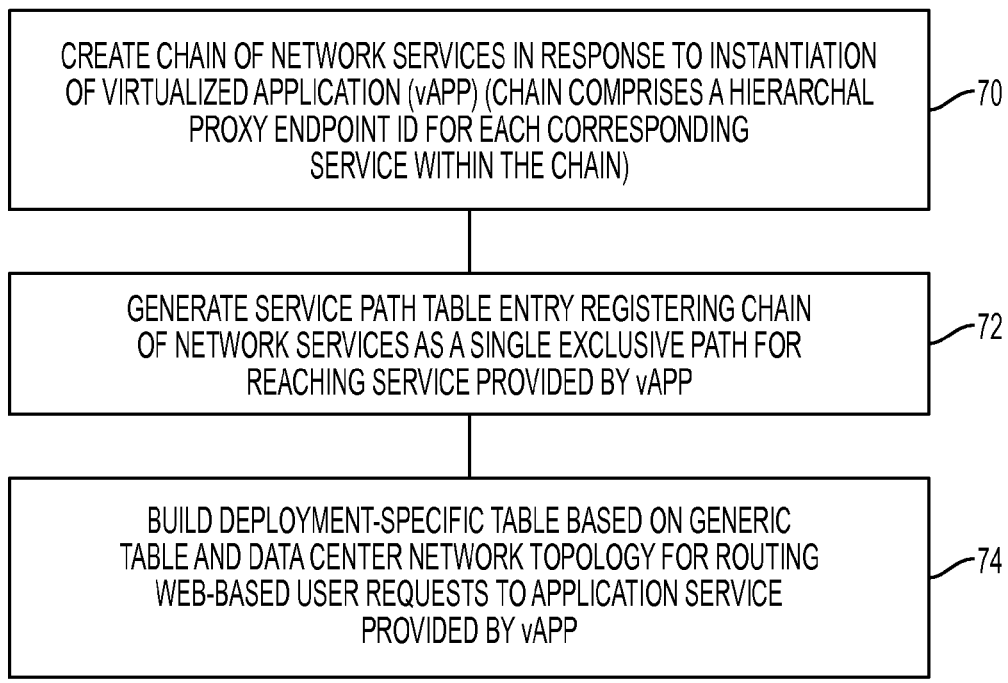
FIG. 4 illustrates a method summarizing the creation and registration of the hierarchal chain of network services for reaching the virtualized application in the data center, according to an example embodiment.

FIG. 4 illustrates a method summarizing the creation and registration of the hierarchal chain of network services for reaching the virtualized application in the data center, according to an example embodiment. FIGS. 5A and 5B illustrate in further detail the creation of the hierarchal chain of network services, according to an example embodiment.

The operations described in any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 4, the processor circuit 66 of the apparatus 12 implemented within the aggregation switch 50 can create in operation 70 a hierarchal chain of network services 42 in response to instantiation of the virtualized application 40 providing the application service 48. The application service 48 can be any cloud-based service, for example a web server application, a database application, etc. The hierarchal chain of network services 42 includes, for each corresponding network service within the chain (e.g., the load balancing service 54, the firewall service 52, and the routing service 46), a corresponding hierarchal proxy endpoint identifier (e.g., "PID1", "PID2", and "PID3") for reaching application service 48.

As described below, each network service can accumulate the respective registrations 62 that are generated in response to instantiation of the virtualized application 40, enabling the processor circuit 66 in the aggregation switch 50 to generate in operation 72 a service path table entry that registers the chain of network services 42 as a logical path 44 for reaching the application service 48 within the virtualized data center 16. In one embodiment, the chain of network services 42 can be registered as a single exclusive logical path 44 for reaching the application service 48 provided by the virtualized application 40; in another embodiment, the chain of network services 42 can be registered as one of multiple available logical paths 44 for reaching the application service 48 provided by different virtualized applications 40 in a distributed environment. An example service path table 76 is described below with respect to FIG. 6.

Figure 6:
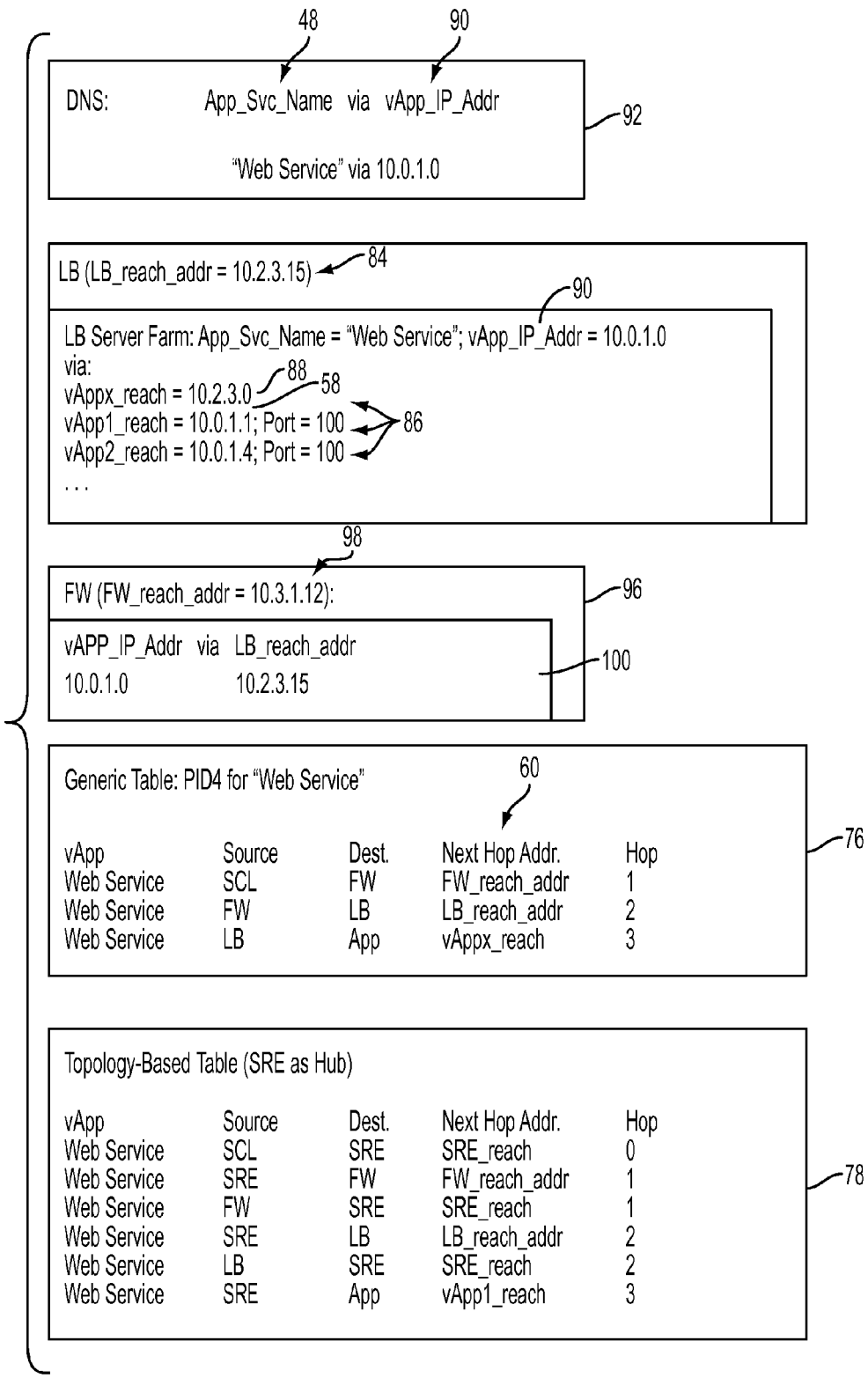
FIG. 6 illustrates example data structures stored in non-transitory machine-readable memory circuits within the devices of FIG. 2 for creation of the hierarchal chain of network services, according to an example embodiment.

The service path table 76 generated in operation 72 by the processor circuit 66 is a generic logical table that identifies the logical path 44 for reaching the application service 48 in any generic network topology. As illustrated in FIG. 6, the processor circuit 66, in response to receiving the registration requests "R1", "R2", and "R3" (or at least portions thereof), can create the service path table 76 for reaching the chain of network services 42 via the hop-by-hop path of the hierarchal proxy endpoint identifiers "PID3", "PID2", and "PID1" 60, illustrated as the advertised reachability addresses "FW_reach_addr", "LB_reach_addr", and "vAppx_reach", respectively, described in further detail below.

Hence, the processor circuit 66 also can create in operation 74 a single exclusive topology-based logical path for reaching the application service 48 provided by the virtualized application 40, based on implementing the logical path 44 using a prescribed physical topology deployed within the virtualized data center 16. As described below, example physical topologies can include utilizing Service Integration Architecture (SIA), Virtual Local Area Network (VLAN), Virtual Routing and Forwarding (VRF), or the commercially available Cisco vPath from Cisco Systems, Inc. As described below, the processor circuit 66 can implement the logical path 44 specified in the generic table 76 of FIG. 6 to create a single exclusive topology-based logical path in the form of a topology-based table 78, for example using a topology where a service routing engine (SRE) 50 is implemented as a hub for reaching each of the services 46, 52, 54, and 48.

Figure 5:
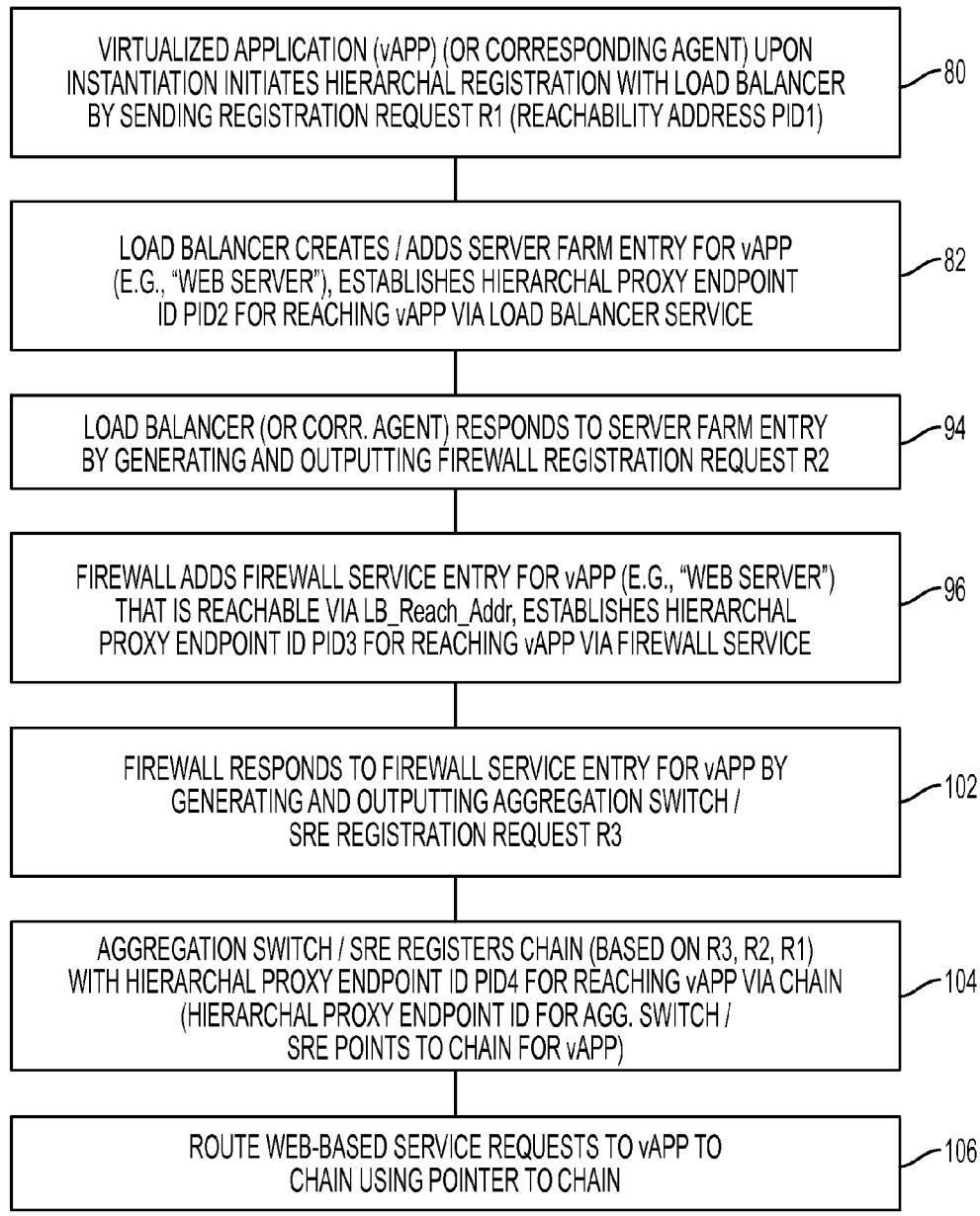
FIG. 5 illustrates in further detail the creation of the hierarchal chain of network services, according to an example embodiment.

FIG. 5 illustrates in further detail the method of creating the hierarchal chain of network services 42 in response to instantiation of the virtualized application 40, and registering the chain as a logical path 44 for reaching the application service 48. The registration of the chain 42 as a logical path 44 for reaching the application service 48 enables the network interface circuit 64 of the aggregation switch 50 to route a web-based service requests for the application service 48 to the chain of network services 42 for execution by the virtualized application 40.

The virtualized application 40 in operation 80 can initiate hierarchal registration with the load balancer device 32 in response to instantiation of the virtualized application 40, based on sending the first registration request "R1" 62. As illustrated in FIG. 2, the load balancer 32 executing the load balancing service 54 provides an exclusive service endpoint for reaching the virtualized application 40.

The first registration request "R1" can indicate that the application service (e.g., "Web Server") is reachable via a first reachable address that is in use by the virtualized application 40. For example, the first registration request "R1" 62 sent to the load balancer 32 can register a "flow" that is identifiable by the name of the application service (e.g., App_Svc_Name="Web Service") and a reachability address (e.g., vApp1_reach=10.0.1.1; Port=100) (although the specification illustrates IPv4 addresses, IPv6 addresses also can be used). The first registration request "R1" 62 also can specify a logical IP application service address 90 (illustrated in FIG. 6) that is associated with the application service 48, for example by registering the logical IP service address 90 with a domain name server (DNS) within the virtualized data center 16 (e.g., App_Svc_Name="Web Service" via vApp_IP_Addr=10.0.1.0); hence, the first registration request "R1" generated and output by the virtualized application 40 can specify the name of the application service (e.g., App_Svc_Name="Web Service"), the reachability address 58 for the virtualized application 40 (vApp1_reach=10.0.1.1; Port=100), and the logical IP service address (e.g., vApp_IP_Addr=10.0.1.0) 90.

The load balancer device 32 in operation 82 can respond to the first registration request "R1" 62 by creating a first hierarchal proxy endpoint identifier "PID2" 60, illustrated in FIG. 6 as a reachability address "LB_reach_addr=10.2.3.15" 84. The load balancer device 32 in operation 82 also can create or update a "server farm entry" 86 for managing multiple instances of the virtualized application 40 for the same application service 48 having the application service name of "Web Service" at the logical IP service address 90 of "10.0.1.0" (as registered by the virtualized application 40 within the domain name service entry 92). Hence, each instantiation of a virtualized application 40 for the same application service 48 results in the addition of a corresponding server farm entry 86. As illustrated in FIG. 6, the load balancer device can create a generic virtualized reachable address 88 that serves as a pointer into the server farm entries 86, enabling the load balancing device 32 to choose among the available instances of the virtualized application 40 to provide the application service 48.

The load balancer device 32 in operation 94 also can respond to the reachability message "R1" 62 based on generating and outputting a second registration request "R2" 62 to the firewall device 34 executing the firewall service 52, where the firewall service 52 provides an exclusive service endpoint for reaching the virtualized application 40 via the load balancing service 54. The second registration request "R2" can specify that reachability to the application service "Web Service" 48 (identifiable by the logical IP service address 90 of "10.0.1.0") requires use of the hierarchal proxy endpoint identifier "PID2" 60 assigned by the load balancer 32, illustrated for example in FIG. 6 as the load balancer reachability address "LB_reach_addr=10.2.3.15" 84.

The firewall device 34 can respond in operation 96 to the registration request "R2" 62 by updating its internal firewall access table by creating its corresponding hierarchal proxy endpoint identifier "PID3" 60, illustrated for example in FIG. 6 as the firewall reachability address "FW_reach_addr=10.3.1.12" 98. The firewall device also can add a firewall service table entry 100 specifying that the reachability to the application service "Web Service" 48 (identifiable by the logical IP service address 90 of "10.0.1.0") requires use of the hierarchal proxy endpoint identifier "PID2" 60 assigned by the load balancer 32, illustrated for example in FIG. 6 as the load balancer reachability address "LB_reach_addr=10.2.3.15" 86.

The firewall device 34 also responds in operation 102 to the registration request "R2" 62 by generating and outputting the aggregation switch/SRE registration request "R3" to the aggregation switch 50 providing the routing service 46. The routing service 46 provides an exclusive service endpoint for reaching the virtualized application via the firewall service 52. The registration request "R3" 62 specifies that reachability to the application service "Web Service" 48 via the firewall service 52 requires use of the hierarchal proxy endpoint identifier "PID3", illustrated in FIG. 6 as the firewall reachability address "FW_reach_addr=10.3.1.12".

As described previously, the processor circuit 66 in the aggregation switch 50, in response to receiving the registration requests "R1", "R2", and "R3" (or at least portions thereof), can create in operation 104 the service path table 76 for reaching the chain of network services 42 via the hop-by-hop path of the hierarchal proxy endpoint identifiers "PID3", "PID2", and "PID1" 60, illustrated as the advertised reachability addresses "FW_reach_addr" 98, "LB_reach_addr" 84, and "vAppx_reach" 88, respectively. The aggregation switch 50 can register the chain using its own hierarchal proxy endpoint identifier "PID4" 60 as a pointer into the table 76 for the application service "Web Service" 48 executed by the virtualized application 48.

The service path table 76 illustrates the logical path 44 as containing three hops, starting with a service classifier (SCL) resource address as the source address from the aggregation switch 50 for the first hop to the firewall service 52 via the firewall reachability address "FW_reach_addr" 98; the second hop in the logical path 44 is from the firewall service 52 to the load balancing service 54 via the load balancer reachability address "LB_reach_addr" 84; the third hop in the logical path 44 is from the load balancing service 54 to the application service "Web Service" via the virtualized application reachability address "vAppx_reach" 88. As described previously, the virtualized application reachability address "vAppx_reach" 88 can be used by the load balancing service 54 as a pointer to select one of the multiple available virtualized applications 40 for execution of the application service 48.

Hence, the registration messages R1, R2, and R3 62 initiated in response to instantiation of the virtualized application 40 enables the hierarchal chain of network services 42 to be registered in the aggregation switch 50 as a service path table 76 providing reachability to the application service 48 executed by the virtualized application 40. The registration of the chain of network services as a logical path for reaching the application service 48 eliminates the necessity for manually provisioning any network path for reaching the virtualized application 40, since the registration messages 62 effectively advertise reachability to the aggregation switch 50, enabling the aggregation switch in operation 106 to route web-based service requests to the virtualized application 40 using the hierarchal endpoint identifier "PID4" as a pointer to the logical path 44 for reaching the application service 48.

FIG. 6 further illustrates that the processor circuit 66 in the aggregation switch 50 (implemented, for example, using an SRE) can generate a topology-specific routing table 78. As illustrated in FIG. 6, the SRE can be implemented as a hub-based topology, such that the SRE 50 serves as a hub, and each of the services (e.g., firewall service 52, load balancing service 54, and application service 48) are "spoke endpoints" relative to the hub. Hence, a web-based service request is routed, according to the topology-based logical path table 78, from the SCL to the SRE hub (hop 0); from the SRE hub to the firewall service 52 (hop 1); from the firewall service 52 back to the SRE hub (hop 1); from the SRE hub to the load balancer service 54 (hop 2); from the load balancer service 54 back to the SRE hub (hop 2); and from the SRE hub to the application service 48 (hop 3).

According to example embodiments, a hierarchal chain of network services can be created in response to instantiation within a virtualized data center of a virtualized application providing an application service, where hierarchal chain provides a logical path for reaching the application service within the virtualized data center without the necessity of provisioning any network services for reaching the virtualized application. The hierarchal chain of network services provides a generic topology that can be applied to any data center technologies or services, regardless of the network topology used to deploy the virtualized data center.

Although the network services were illustrates as providing firewall and load balancing services, other applications and services can be employed in creating the hierarchal chain. For example, a hierarchal chain as described herein can be used to provide access to application services using particular schemas, for example extensible markup language; in this example, the hierarchal chain of network services can include an XML gateway that "firewalls" service requests by validating XML syntax, etc., and an XML-based service proxy that "load balances" by directing requests according to prescribed service policies (e.g., premium subscription service, employee-only service, guest service, etc.).

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   creating a hierarchal chain of network services in response to instantiation within a data center of a virtualized application providing an application service, the creating and the instantiation separate and independent from any access to the virtualized application, the chain initiated by the virtualized application in response to instantiation thereof providing reachability to the application service and without provisioning to reach the virtualized application, the chain comprising a contiguous sequence of logical hops generated from the virtualized application to a routing service executed within the data center, the chain identifying each logical hop with a corresponding hierarchal proxy endpoint identifier for the corresponding network service in the chain;
   registering the chain of network services as a logical path within the data center for reaching the application service; and
   routing, within the data center, a web-based service request for the application service to the chain of network services for execution by the virtualized application.

2. The method of claim 1, wherein the creating includes:
   the virtualized application sending a first registration request to a first network service providing an exclusive service endpoint for reaching the virtualized application, the first registration request indicating the application service is reachable via a first reachable address in use by the virtualized application;
   the first network service responding to the first registration request by creating the corresponding hierarchal proxy endpoint identifier, as a first hierarchal proxy endpoint identifier, and a corresponding first hierarchal table entry specifying that the application service is reachable via the first reachable address; and
   the first network service sending a second registration request to a second network service providing an exclusive service endpoint for reaching the virtualized application via the first network service, the second registration request specifying that reachability to the application service via the first network service requires the first hierarchal proxy endpoint identifier.

3. The method of claim 2, wherein the creating further includes:
   the second network service responding to the second registration request by creating the corresponding hierarchal proxy endpoint identifier, as a second hierarchal proxy endpoint identifier, and a corresponding second hierarchal table entry specifying that the application service via the first network service is reachable via the first hierarchal proxy endpoint identifier;
   the second network service sending a third registration request to a third network service providing an exclusive service endpoint for reaching the virtualized application via the second network service, the third registration request specifying that reachability to the application service via the second network service requires the second hierarchal proxy endpoint identifier.

4. The method of claim 3, wherein the registering includes the third network service registering the chain based on receiving the third registration request, and in response creating a third hierarchal proxy endpoint identifier for reachability to the application service via the second hierarchal proxy endpoint identifier.

5. The method of claim 1, wherein the registering includes:
   receiving registration requests from each network service in the chain, each registration request specifying that reachability to the application service via the corresponding network service requires the corresponding hierarchal proxy endpoint identifier; and
   creating a service path table specifying, for each network service in the chain associated with the application service, the corresponding hierarchal proxy endpoint identifier, and a corresponding reachable address for reaching a network device executing the corresponding network service.

6. The method of claim 1, wherein the registering includes creating a single exclusive topology-based logical path for reaching the application service, within the data center, based on implementing the logical path based on a prescribed physical topology deployed within the data center.

7. The method of claim 1, further comprising the virtualized application associating the application service within the data center with a virtual IP address, the hierarchal chain providing reachability to the virtual IP address via the sequence of hierarchal proxy endpoint identifiers according to the hierarchal chain.

8. An apparatus comprising:
   a processor circuit configured for creating a hierarchal chain of network services in response to instantiation within a data center of a virtualized application providing an application service, the creating and the instantiation separate and independent from any access to the virtualized application, the chain initiated by the virtualized application in response to instantiation thereof providing reachability to the application service and without provisioning to reach the virtualized application, the chain comprising a contiguous sequence of logical hops generated from the virtualized application to a routing service executed within the data center, the chain identifying each logical hop with a corresponding hierarchal proxy endpoint identifier for the corresponding network service in the chain;
   the processor circuit further configured for registering the chain of network services as a logical path within the data center for reaching the application service; and
   a network interface circuit configured for routing, within the data center, a web-based service request for the application service to the chain of network services for execution by the virtualized application.

9. The apparatus of claim 8, wherein the processor circuit is configured for creating the hierarchal chain based on:
   a machine executing the virtualized application sending a first registration request to a machine executing a first network service providing an exclusive service endpoint for reaching the virtualized application, the first registration request indicating the application service is reachable via a first reachable address in use by the virtualized application;
   the first network service responding to the first registration request by creating the corresponding hierarchal proxy endpoint identifier, as a first hierarchal proxy endpoint identifier, and a corresponding first hierarchal table entry specifying that the application service is reachable via the first reachable address; and
   the first network service sending a second registration request to a machine executing a second network service providing an exclusive service endpoint for reaching the virtualized application via the first network service, the second registration request specifying that reachability to the application service via the first network service requires the first hierarchal proxy endpoint identifier.

10. The apparatus of claim 9, wherein the creating further includes:
the machine executing the second network service responding to the second registration request by creating the corresponding hierarchal proxy endpoint identifier, as a second hierarchal proxy endpoint identifier, and a corresponding second hierarchal table entry specifying that the application service via the first network service is reachable via the first hierarchal proxy endpoint identifier;
the machine executing the second network service sending a third registration request to a machine executing a third network service providing an exclusive service endpoint for reaching the virtualized application via the second network service, the third registration request specifying that reachability to the application service via the second network service requires the second hierarchal proxy endpoint identifier.

11. The apparatus of claim 10, wherein the registering includes the third network service registering the chain based on receiving the third registration request, and in response creating a third hierarchal proxy endpoint identifier for reachability to the application service via the second hierarchal proxy endpoint identifier.

12. The apparatus of claim 8, wherein the registering includes:
receiving registration requests from each network service in the chain, each registration request specifying that reachability to the application service via the corresponding network service requires the corresponding hierarchal proxy endpoint identifier; and
creating a service path table specifying, for each network service in the chain associated with the application service, the corresponding hierarchal proxy endpoint identifier, and a corresponding reachable address for reaching a network device executing the corresponding network service.

13. The apparatus of claim 8, wherein the registering includes creating a single exclusive topology-based logical path for reaching the application service, within the data center, based on implementing the logical path based on a prescribed physical topology deployed within the data center.

14. The apparatus of claim 8, wherein further comprising the virtualized application associating the application service within the data center with a virtual IP address, the hierarchal chain providing reachability to the virtual IP address via the sequence of hierarchal proxy endpoint identifiers according to the hierarchal chain.

15. Logic encoded in one or more non-transitory tangible media for execution by a machine and when executed operable for:
creating a hierarchal chain of network services in response to instantiation within a data center of a virtualized application providing an application service, the creating and the instantiation separate and independent from any access to the virtualized application, the chain initiated by the virtualized application in response to instantiation thereof providing reachability to the application service and without provisioning to reach the virtualized application, the chain comprising a contiguous sequence of logical hops generated from the virtualized application to a routing service executed within the data center, the chain identifying each logical hop with a corresponding hierarchal proxy endpoint identifier for each network service in the chain;
registering the chain of network services as a logical path within the data center for reaching the application service; and
routing, within the data center, a web-based service request for the application service to the chain of network services for execution by the virtualized application.

16. The logic of claim 15, wherein the creating includes:
the virtualized application sending a first registration request to a first network service providing an exclusive service endpoint for reaching the virtualized application, the first registration request indicating the application service is reachable via a first reachable address in use by the virtualized application;
the first network service responding to the first registration request by creating the corresponding hierarchal proxy endpoint identifier, as a first hierarchal proxy endpoint identifier, and a corresponding first hierarchal table entry specifying that the application service is reachable via the first reachable address; and
the first network service sending a second registration request to a second network service providing an exclusive service endpoint for reaching the virtualized application via the first network service, the second registration request specifying that reachability to the application service via the first network service requires the first hierarchal proxy endpoint identifier.

17. The logic of claim 16, wherein the creating further includes:
the second network service responding to the second registration request by creating the corresponding hierarchal proxy endpoint identifier, as a second hierarchal proxy endpoint identifier, and a corresponding second hierarchal table entry specifying that the application service via the first network service is reachable via the first hierarchal proxy endpoint identifier;
the second network service sending a third registration request to a third network service providing an exclusive service endpoint for reaching the virtualized application via the second network service, the third registration request specifying that reachability to the application service via the second network service requires the second hierarchal proxy endpoint identifier.

18. The logic of claim 17, wherein the registering includes the third network service registering the chain based on receiving the third registration request, and in response creating a third hierarchal proxy endpoint identifier for reachability to the application service via the second hierarchal proxy endpoint identifier.

19. The logic of claim 15, wherein the registering includes:
receiving registration requests from each network service in the chain, each registration request specifying that reachability to the application service via the corresponding network service requires the corresponding hierarchal proxy endpoint identifier; and
creating a service path table specifying, for each network service in the chain associated with the application service, the corresponding hierarchal proxy endpoint identifier, and a corresponding reachable address for reaching a network device executing the corresponding network service.

20. The logic of claim 15, wherein the registering includes creating a single exclusive topology-based logical path for reaching the application service, within the data center, based on implementing the logical path based on a prescribed physical topology deployed within the data center.

\* \* \* \* \*